(12) United States Patent
Kuhn et al.

(10) Patent No.: US 6,587,068 B2
(45) Date of Patent: Jul. 1, 2003

(54) POLICE RADAR/LASER DETECTOR WITH INTEGRAL VEHICLE PARAMETER DISPLAY

(75) Inventors: John Kuhn, West Chester, OH (US); Jeffrey J. Clawson, Loveland, OH (US)

(73) Assignee: Escort Inc., Cincinnati, OH (US)

( * ) Notice: Subject to any disclaimer, the term of this patent is extended or adjusted under 35 U.S.C. 154(b) by 0 days.

(21) Appl. No.: 09/973,623

(22) Filed: Oct. 9, 2001

(65) Prior Publication Data

US 2003/0067407 A1 Apr. 10, 2003

(51) Int. Cl.$^7$ ................................. G01S 7/40
(52) U.S. Cl. ...................... 342/20; 342/70; 342/71; 342/72; 342/54; 342/104; 342/114; 342/115
(58) Field of Search ..................... 342/20, 70, 71, 342/72, 54, 104, 114, 115, 176, 182, 183; 340/903, 435, 436; 455/227, 228

(56) References Cited

U.S. PATENT DOCUMENTS

| | | | |
|---|---|---|---|
| 3,856,991 A | 12/1974 | Kirkland, Jr. et al. ...... 179/1 P |
| 4,257,273 A | 3/1981 | Knowd .................. 73/647 |
| 4,347,573 A | 8/1982 | Friedland ................ 364/453 |
| 4,413,522 A | 11/1983 | Leatherwood et al. ...... 73/646 |
| 4,424,511 A | 1/1984 | Alberts, Jr. ............. 73/646 |
| 4,908,767 A | 3/1990 | Scholl et al. ............ 364/453 |
| 5,510,793 A | 4/1996 | Gregg, III et al. ........ 342/20 |
| 5,717,398 A | 2/1998 | Pollin ................... 342/20 |
| 5,805,079 A | 9/1998 | Lemelson .............. 340/870.05 |
| 5,815,092 A | 9/1998 | Gregg, III et al. ......... 340/936 |
| 5,977,884 A | 11/1999 | Ross .................... 340/936 |
| 6,023,236 A | 2/2000 | Shelton ................. 342/104 |
| 6,118,403 A | 9/2000 | Lang ................... 342/357.09 |
| 6,163,277 A | * 12/2000 | Gehlot ................. 340/905 |
| 6,201,493 B1 | 3/2001 | Silverman ............... 342/20 |
| 6,204,798 B1 | 3/2001 | Fleming, III ............. 342/20 |
| 6,474,683 B1 | * 11/2002 | Breed et al. ............ 280/735 |
| 6,480,103 B1 | * 11/2002 | McCarthy et al. ....... 340/425.5 |
| 2001/0013835 A1 | * 8/2001 | Hsu et al. .............. 340/905 |
| 2002/0067286 A1 | * 6/2002 | Hsu et al. .............. 340/901 |
| 2002/0113727 A1 | * 8/2002 | Kuhn et al. ............. 340/20 |
| 2002/0116156 A1 | * 8/2002 | Remboski et al. ........ 702/188 |

OTHER PUBLICATIONS

"Integrated automotive sensors", Russell, M.E.; Drubin, C.A.; Marinilli, A.S.; Woodington, W.G.; Del Checcolo, M.J. , Microwave Theory and Techniques, IEEE Transactions on, vol. 50 Issue: 3, Mar. 2002, pp.: 674–677.*

* cited by examiner

Primary Examiner—John B. Sotomayor
(74) Attorney, Agent, or Firm—Wood, Herron & Evans, L.L.P.

(57) ABSTRACT

A police radar and/or laser detector senses radiant electromagnetic signals (e.g. radar, laser) characteristic of a police traffic surveillance device and responds thereto with a displayed and/or audible alert. During periods when no alert is necessary, the detector senses and displays, in numeric or bar graph form, vehicle parameters, such as sound pressure level and acceleration. In addition, calculations based on acceleration provide 0–60 m.p.h. time and quarter mile time. Thereby, the detector enhances information available to the driver without the inconvenience, expense, and clutter of multiple displays.

33 Claims, 5 Drawing Sheets

POLICE RADAR/LASER DETECTOR WITH INTEGRAL VEHICLE PARAMETER DISPLAY

FIELD OF THE INVENTION

The present invention relates generally to police radar/laser detectors, and more particularly, to displays for police radar/laser detectors.

BACKGROUND OF THE INVENTION

Police traffic surveillance devices emit an electromagnetic signal in the radio frequency (RF) band or light band (i.e., infrared, visible, and ultraviolet light) that reflect off of approaching or departing vehicles to determine their speed. In particular, a change in frequency (Doppler shift) or a change in time of travel for return signal pulses is sensed for calculating vehicle speed.

Police radar and laser detectors ("detectors") are used by drivers of vehicles to detect radiant electromagnetic signals characteristic of police traffic surveillance devices. In particular, the following RF (radar) frequency bands are used: X-band (10.525 GHz±25 MHz); K-band (24.150 GHz±100 MHz); and Ka-band (34.700 GHz±1300 MHz). Furthermore, laser wavelength of 904 nm with 33 MHz bandwidth is also used. These detectors are generally a detachable device clipped to a visor or dash of the vehicle for unimpeded sensing of the signals and for providing a conveniently positioned display and one or more controls to the driver. While police radar/laser detectors successfully provide alerts to the driver, generally during significant portions of time there are no alerts to be made. Consequently, the display capabilities of the detector are generally limited to displaying the operating mode ("pilot mode") of the detector. In addition to the under-utilized display, detectors increasingly use digital signal processors for processing received electromagnetic signals that operate faster with additional data and program storage capabilities. Consequently, the processing capacity of the detectors is also under-utilized much of the time. For example, detectors spend less than two percent of their operating time alerting the user of received electromagnetic signals.

Taking advantage of the unused capacity of a detector would increase its value. For instance, many drivers would benefit from the display of other sensed conditions associated with their vehicle. However, sensor displays integral to the vehicle instrument panel are either expensive or unavailable for certain models. Using after-market displays is inconvenient and tends to clutter the interior of the vehicle. Consequently, drivers often forego incorporating additional displays for sensed conditions.

Therefore, a significant need exists for a police radar/laser detector that incorporates additional sensing and display of conditions associated with a vehicle.

SUMMARY OF THE INVENTION

The present invention addresses these and other problems in the prior art by providing a police radar/laser detector that senses and displays a vehicle parameter, such as a sound pressure level, acceleration, etc. During those periods when the detector is not required to alert the driver of a police traffic surveillance device, the detector is configured to provide additional valuable information to the driver.

Consistent with one aspect of the invention, a detector and method of using a detector include a receiver that receives an electromagnetic signal emitted by a police traffic surveillance device. A controller responds to the received electromagnetic signal by initiating a visual and/or audible alert. The controller also responds to a sensed vehicle parameter by displaying the parameter when the alert is not present.

Consistent with an additional aspect of the invention, a detector similarly responds to sensed electromagnetic signal by initiating an alert. Advantageously, the detector includes a sensor for sensing sound pressure or acceleration. A controller is responsive to the sensor to display sound pressure or acceleration.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

A police radar and/or laser detector senses radiant electromagnetic signals (e.g. radar, laser) characteristic of a police traffic surveillance device and responds thereto with a displayed and/or audible alert. During periods when no alert is necessary, the detector senses and displays, in numeric or bar graph form, vehicle parameters, such as sound pressure level and acceleration. In addition, calculations based on acceleration provide 0–60 m.p.h. time and quarter mile time. Thereby, the detector enhances information available to the driver without the inconvenience, expense, and clutter of multiple displays.

Figure 1:
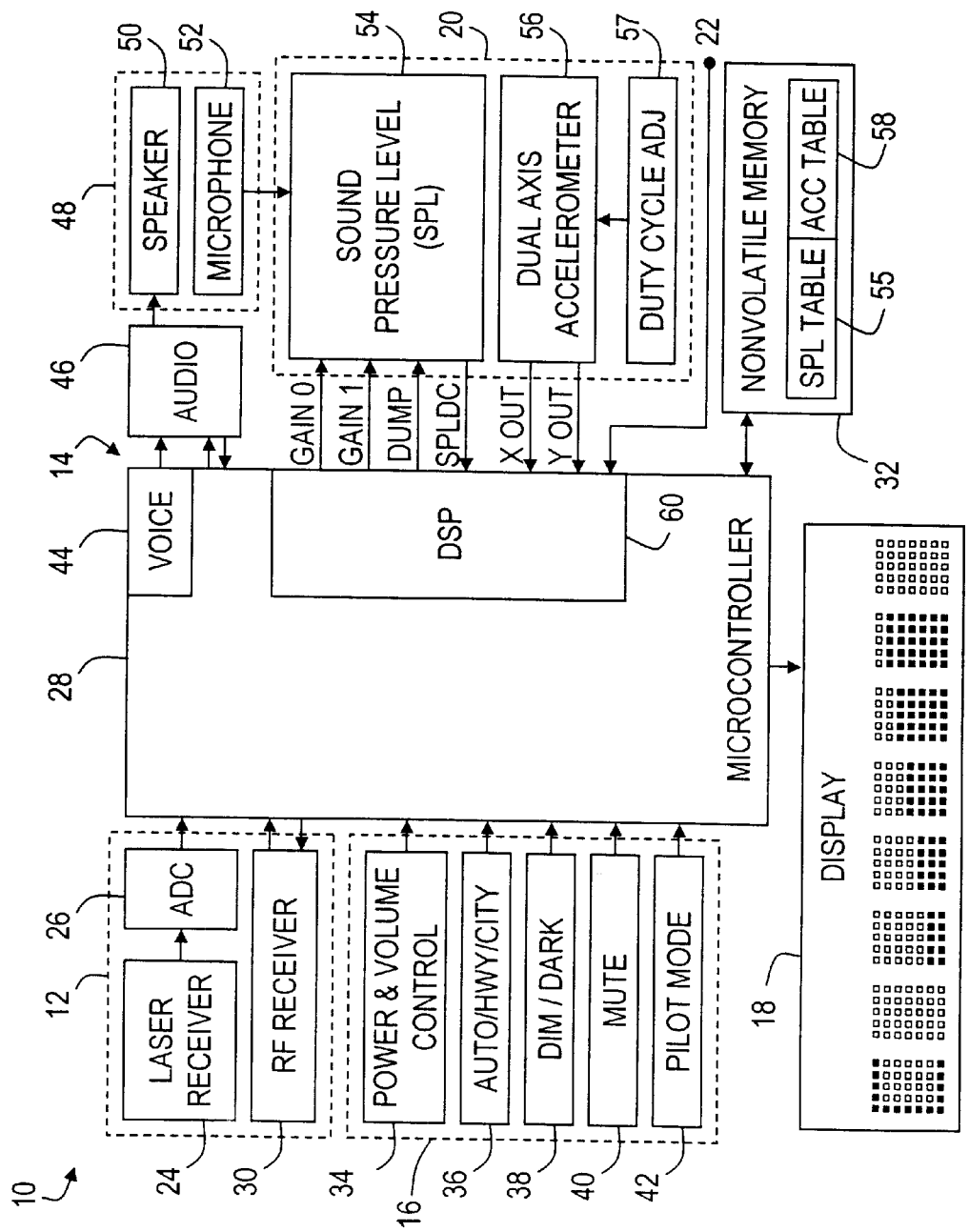
FIG. 1 is a block diagram of a police radar/laser detector incorporating vehicle parameter sensing of sound pressure and acceleration.

Turning to the drawings, wherein like parts have like numbers throughout the several views, FIG. 1 depicts a police radar/laser detector 10 for use in a vehicle such as a car or truck. In particular, the detector 10 includes a front end portion 12 for receiving radiant electromagnetic signals (e.g., radar, laser) in frequency bands characteristically used by police traffic surveillance devices. The received signals are demodulated for processing by a back end portion 14.

A user selects processing options through controls 16. The back end portion 14 responds by confirming selected options and results of processing on a display 18. In the illustrative embodiment, an alphanumeric dot matrix display (LED) is used for displaying alphanumeric and bar graph representations, in a manner described in U.S. Pat. No.

5,668,554, the disclosure of which is expressly incorporated herein by reference. The detector 10 also includes a vehicle sensor 20 for sensing a vehicle parameter. Alternatively or in addition to, a vehicle sensor connection 22 may be coupled to remote sensors in or on the vehicle to sense the same or other vehicle parameters.

In the illustrative embodiment, the detector 10 is configured to sense both radar (i.e. radio frequency, or RF, signals) and laser signals. Thus, the front end 12 has a laser receiver 24 that senses illumination by a laser. The general operation of the laser receiver 24 is described in U.S. Pat. No. 5,206,500, the disclosure of which is expressly incorporated herein by reference. The received laser signal is converted to an analog electrical voltage that is converted to a digital value by an analog-to-digital converter (ADC) 26.

The digital value is input to a microcontroller 28 such as the 68HC908GP32 microprocessor manufactured by Motorola.

The front end portion 12 receives signals with an RF receiver 30. The microcontroller 28 performs digital signal processing on the input signals received from the front end portion 12, storing values and control settings in nonvolatile memory 32. The general operation of the RF receiver 30 and microcontroller 28 is described in U.S. Pat. No. 4,313,216; U.S. Pat. No. 4,581,769; U.S. Pat. No. 4,954,828; U.S. Pat. No. 5,049,885; U.S. Pat. No. 5,079,553; and U.S. Pat. No. 5,305,007, the disclosures of which are expressly incorporated herein by reference.

The controls 16 include a power and volume control rotatory dial 34. An "AUTO/HWY/CITY" button 36 toggles a sensitivity setting for the RF receiver 30 between automatic, highway, and city settings. A "dim/dark" button toggles the brightness level of the display between a daylight setting, a dim setting, and a dark mode wherein only audible alerts are used. A mute button 40 disables a current audible alert. In addition, a pilot mode button 42 is advantageously added to sequence through various operating modes.

The microcontroller 28, or controller, advantageously includes sufficient processing capability to incorporate voice circuitry 44 that generates verbal alerts that are amplified by an audio driver 46 for broadcast by an audio interface 48, in particular a speaker 50. The audio interface 48 provides sound pressure sensing by either a separate microphone 52 or by alternating use of the speaker 50 as a microphone and a speaker. The sensed sound pressure signal from the microphone 52 is received by sound pressure level (SPL) circuitry 54 of the vehicle sensor 20. The SPL circuitry 54 amplifies and outputs a peak level DC analog signal ("SPLDC") to the microcontroller 28. The controller 28 converts the SPLDC to a corresponding SPL in dB by referencing an SPL lookup table 55 stored in memory 32.

The vehicle sensor 20 also includes a dual axis accelerometer 56 of the vehicle sensor 20, which produces longitudinal and lateral acceleration signals (X OUT, Y OUT). Each acceleration signal has an overall period set by a duty cycle adjustment 57. The acceleration causes a positive logic pulse to vary the duty cycle of the acceleration signal. For a given period, a duty cycle sensed in the acceleration signal may be converted to the corresponding acceleration, or G, by use of an acceleration lookup table 58, stored in memory 32. As an alternative to using the duty cycle adjustment 57 to correct the period of the acceleration signal to match the table 58, it will be appreciated that a correction may be implemented as a software calculation by the controller 28. In the illustrative embodiments, the accelerometer 56 comprises a 2-axis acceleration sensor on a single IC chip, e.g., model ADXL202E accelerometer manufactured by Analog Devices of Norwood, Mass. Other accelerometers, including one-axis accelerometers may be used in the alternative.

The microcontroller 28 incorporates DSP input/out (I/O) circuitry 60 for receiving the analog signals SPLDC, X OUT, Y OUT from the vehicle sensor 20. The DSP I/O 60 also controls the SPL circuitry 54 by setting a gain level (1–4) via gain signals Gain 0, Gain 1. The DSP I/O 60 also controls the peak level refresh rate with a dump signal to the SPL circuitry 54.

Figure 2:
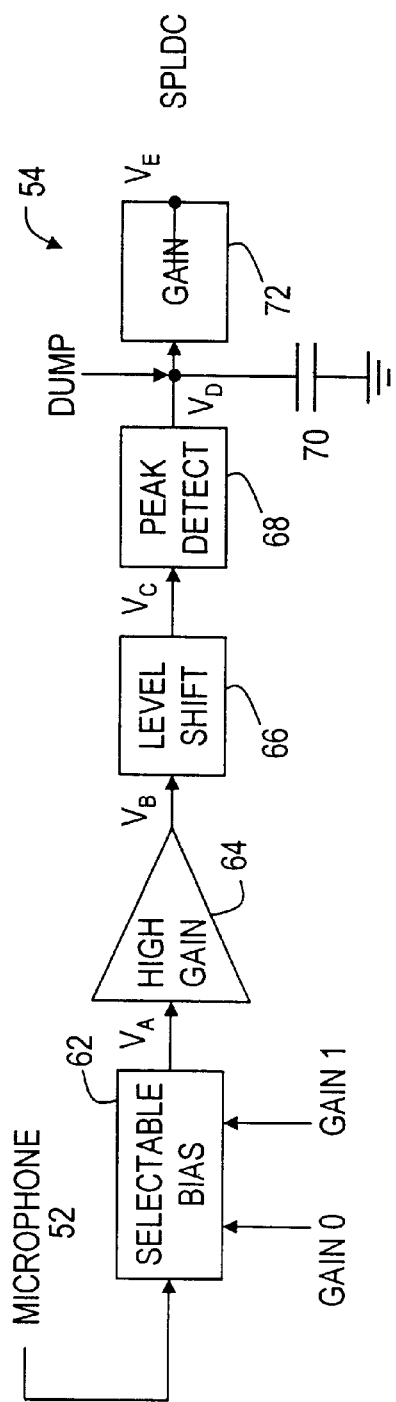
FIG. 2 is a block diagram of the sound pressure level circuitry referenced in FIG. 1.
Figure 2A:
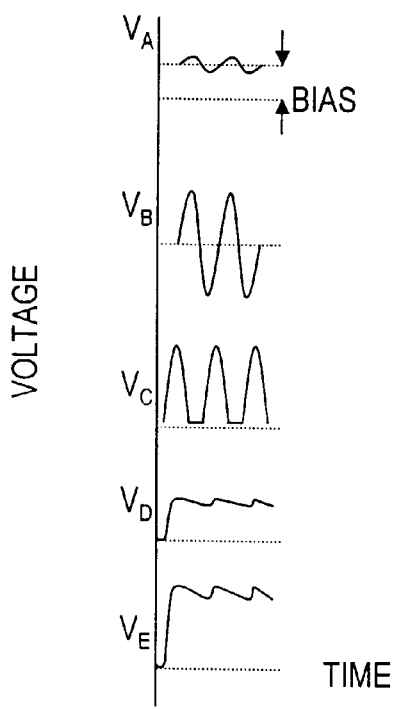
FIG. 2A is a series of voltage plots as a function of time for various nodes depicted in FIG. 2.

Referring to FIG. 2, the SPL circuitry 54 is depicted in block diagram form, with intermediate voltage values $V_A$–$V_E$ illustrated in FIG. 2A. In order to obtain a wide acoustic range in SPL sensing, the SPL circuitry 54 begins with a selectable bias circuit 62. One of four bias levels is selectable (Gain 0, Gain 1=00, 01, 10, 11), so that a biased voltage signal $V_A$ is maintained within the input range of a high gain circuit 64 to produce an amplified voltage signal $V_B$. A level shift circuit 66 positively biases the amplified voltage signal $V_B$ to level shifted voltage signal $V_C$ as a first step in converting the high frequency AC signal to a lower frequency signal for digital signal processing. A peak detect circuit 68 low pass filters the signal $V_C$ to a peak level voltage signal $V_D$. To compensate for a gain loss, a double gain circuit 72 increases the amplification of the signal $V_D$ to an approximately DC voltage signal $V_E$, or SPLDC. A peak hold circuit is provided by a capacitor 70 coupled between the $V_D$ node and ground. Thereby, additional low pass filtering of the peak level voltage signal $V_D$ is provided, periodically reset by the DUMP signal.

Figure 3:
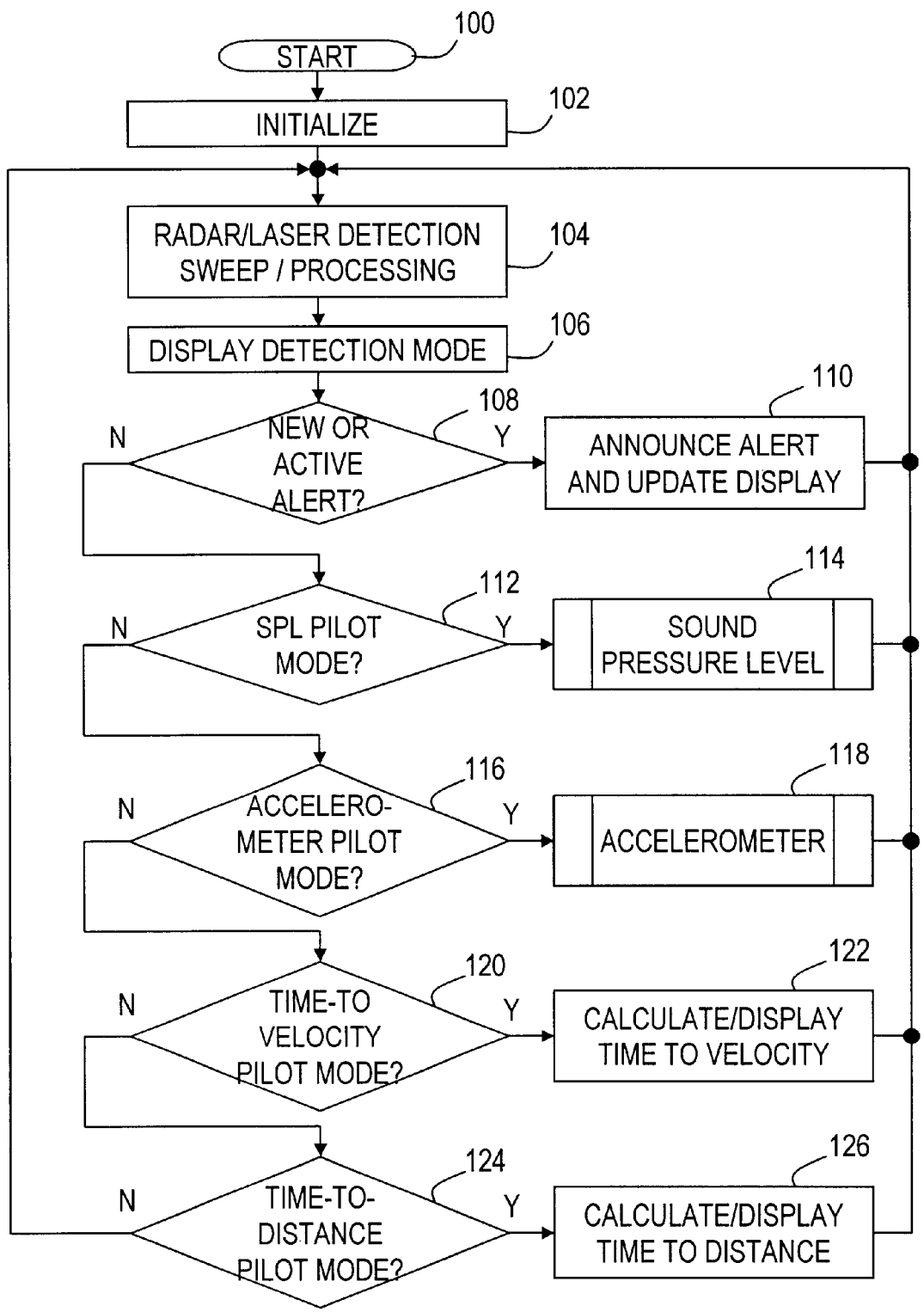
FIG. 3 is a flow chart for a sequence of operations performed by the detector FIG. 1 for initiating alerts and for displaying sensed vehicle parameters.

Referring to FIG. 3, a sequence of operations, depicted as routine 100, is performed by the detector 10 of FIG. 1 for detection and vehicle parameter sensing. During power-up or activation of the pilot mode button, initialization is performed wherein a current pilot mode is read from memory or accepted from the controls (block 102). Routine 100 then enters into a repetitive cycle wherein sweeps and processing are performed for each frequency range characteristic of radiant electromagnetic signals for a police traffic surveillance device (block 104). In addition to sweep processing, the detection mode is displayed (block 106).

If a new or active alert is detected in block 108, then the alert is audibly announced, if enabled, and displayed (block 110). Control returns to block 104, ignoring vehicle parameter sensing. However, it will be appreciated that some applications may continue sensing and displaying a vehicle parameter along with the alert.

If no new or active alert was detected in block 108, then a determination is made as to whether SPL pilot mode is selected (block 112). If so, a sound pressure level routine 114 is performed and processing returns to block 104. If not SPL mode in block 112, then a determination is made as to whether the accelerometer pilot mode is selected (block 116). If so, an accelerometer routine is performed (block 118) and processing returns to block 104. If not accelerometer pilot mode in block 116, then a determination is made as to whether a time-to-velocity pilot mode (e.g. 0-to-60 time) has been selected (block 120). If so, the velocity is calculated by integrating the X OUT acceleration signal (block 122). In particular, the longitudinal acceleration is sampled at very short time intervals and the area under the curve is calculated. The velocity is then calculated using the equation V=VO+a t, where V is current velocity, VO is velocity determined from the previous sample, a is acceleration, and t is time. The total sample time is monitored until the target velocity is reached. The start time for integration may be based by detecting a significant acceleration after a button push. Alternatively, a velocity signal may be received via the external sensor connection.

If not in time-to-velocity pilot mode in block 122, then a determination is made as to whether time-to-distance pilot mode (e.g., quarter mile time) is selected (block 124). If so, distance is calculated and displayed by twice integrating the longitudinal acceleration signal X OUT (block 126). In particular, the acceleration is measured and velocity is calculated during each sample interval as previously described. Then, distance X is calculated using the equation X=XO+VO×t+½ a t², where XO is the distance determined from the previous sample. The total sample time is monitored until the target distance is reached. If not in time-to-distance pilot mode in block 126 or after block 126, processing returns to block 104.

Figure 4:
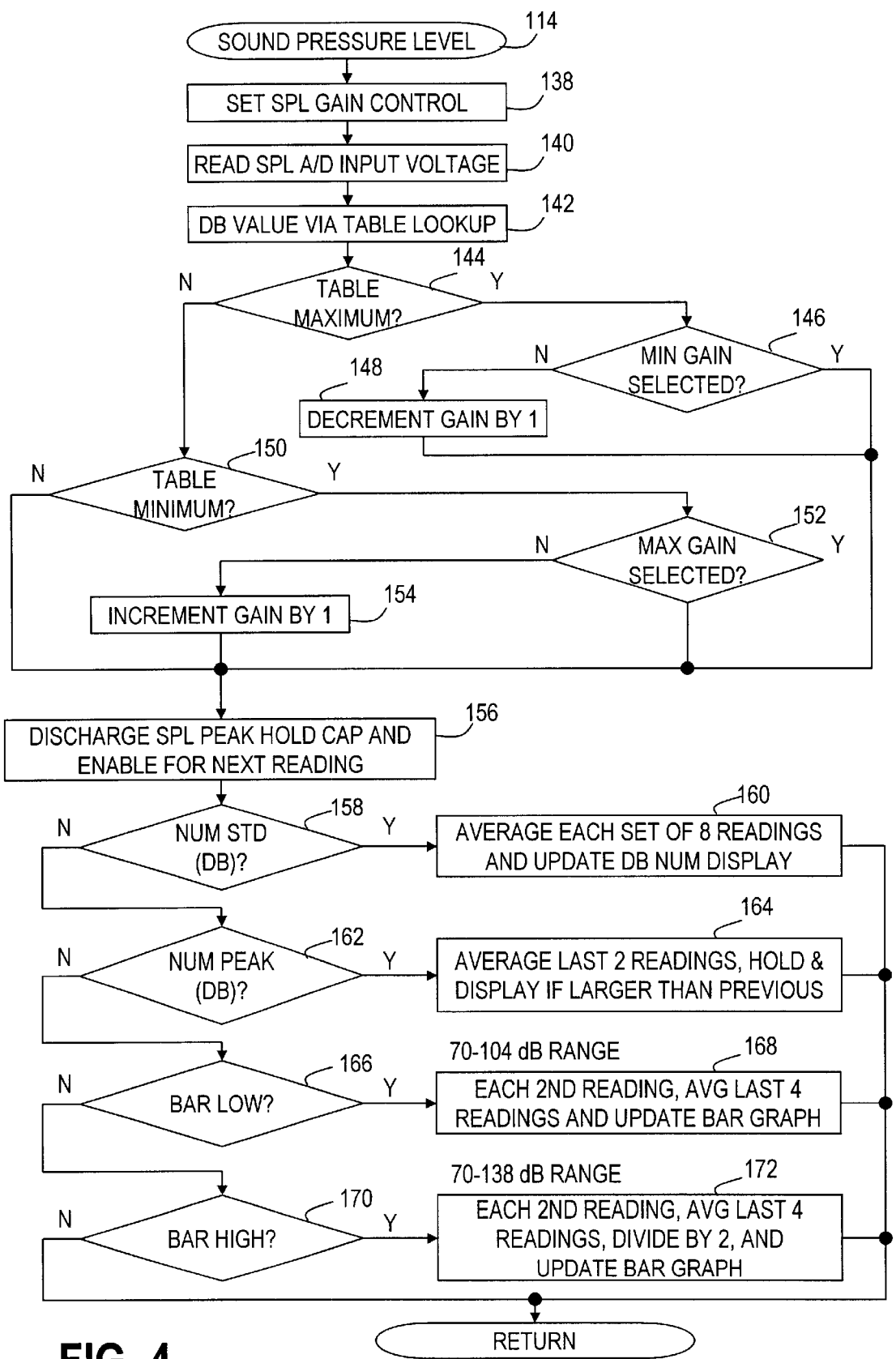
FIG. 4 is a flow chart for the sequence of operation for sound pressure level display referenced in FIG. 3.

With reference to FIG. 4, the SPL routine 114 referenced in FIG. 3 includes a sequence of operations performed by the detector of FIG. 1 for sensing and displaying sound pressure. Since sound pressure levels typically produced by an automotive entertainment system have a wide acoustic range, routine 114 selectably amplifies the sensed analog signal from the SPL sensor with a predetermined gain setting (e.g., 1–4) (block 138). The amplified SPL analog signal from the SPL transducer, such as a microphone, converts this analog signal into a digital signal (block 140) for digital processing. The digital signal is converted into SPL value (dB) by referencing the SPL lookup table having a digital signal to SPL value conversion list for each selected gain setting (block 142).

The analog amplification is kept within an optimum operating range by changing the gain setting when the digital signal approaches either a minimum value or a maximum value in the SPL lookup table. Thus, a determination is made as to whether the digital signal is at or near a maximum value in a particular conversion list (block 144). Each gain setting and corresponding conversion list overlaps with the adjacent gain setting and its corresponding conversion list to avoid exceeding the operating range of the analog amplification of the sensed analog signal. If a table maximum threshold is sensed in block 144, then a further determination is made as to whether the minimum available gain setting is currently selected (block 146). If not, an opportunity exists to lower the gain by decrementing the gain setting by one (block 148).

If not at the table maximum threshold in block 144, then a further determination is made as to whether the digital signal is at a table minimum threshold (block 150). If so, then a further determination is made as to whether the maximum gain setting is currently selected (block 152). If not, an opportunity exists to increase the gain by incrementing the gain setting by one (block 154).

After the gain setting has been evaluated and adjusted as necessary in blocks 144–154, the SPL peak hold cap is discharged with a DUMP command to enable the SPL circuitry to adjust for the next reading (block 156). Also, the SPL value is displayed in a preselected format. If in a standard number format ("NUM STD (DB)") (block 158), then the running average of the preceding eight readings are updated on the display in numeric characters (block 160). Else, if in peak number format ("NUM PEAK") (block 162), then the last two readings are averaged and displayed if larger than the previously displayed value (block 164). Else, if in low bar graph format of 70–104 dB ("BAR LOW") (block 166), then for each second reading, the last four readings are averaged and displayed as a bar graph on the display scaled for 70–104 dB (block 168). Else if in high bar graph format of 70–138 dB ("BAR HIGH") (block 170), then for each second reading, the last four readings are averaged and displayed as a bar graph on the display scaled for 70–138 dB (block 172). After one of the respective four formats is displayed, routine 114 returns for continued sweeps and processing of alerts and SPL readings.

Figure 5:
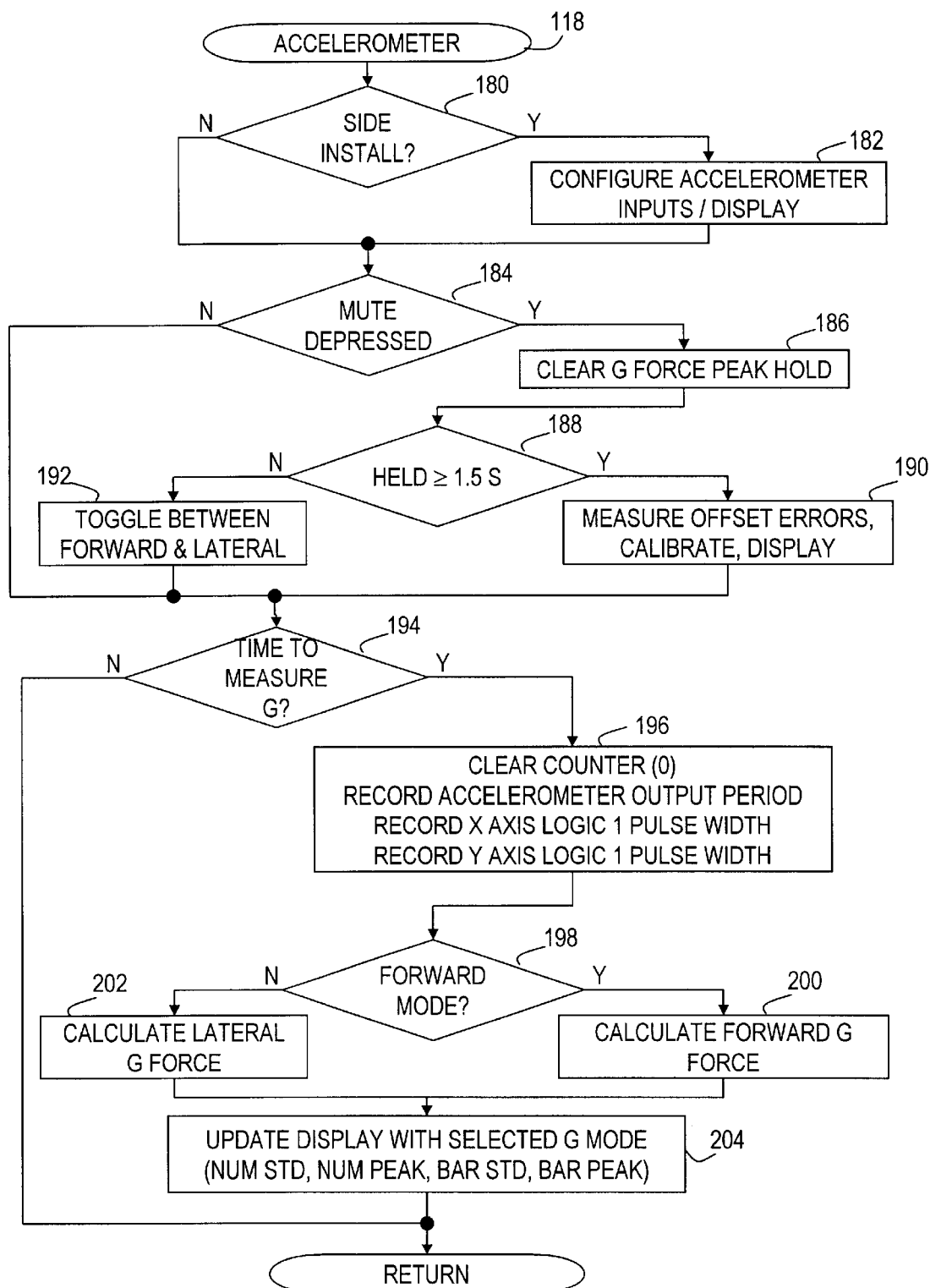
FIG. 5 is a flow chart for the sequence of operation for accelerometer display referenced in FIG. 3.

With reference to FIG. 5, the accelerometer routine 118 of FIG. 3 is depicted for sensing and displaying vehicle parameters derived from lateral or longitudinal acceleration. In some applications, users prefer to install the detector on its lateral side rather than on its bottom, for instance for mounting against a vertical surface in the vehicle. Consequently, routine 118 advantageously accommodates this installation by first determining whether the detector has been mounted on its side ("SIDE INSTALL") (block 180). This determination may be made by referencing a stored user setting or factory installed value. Alternatively, the detector may sense a constant lateral acceleration of approximately 1 G force consistent with gravity. If side installed in block 180, then the accelerometer is configured for side installation. For example, the lateral acceleration capabilities may be disabled or noted as a vertical acceleration. Also, other display functions of the detector may be automatically altered to rotate characters for stacked viewing or to switch directions of a bar graph display (block 182).

Routine 118 responds to a mute button being depressed in block 184 by clearing a G force peak hold. A further determination is made as to whether the mute button has been held for an extended duration (e.g., held at least 1.5 seconds) (block 188), indicating a desire by the user for the detector to measure offset errors in the accelerometer, calibrate for the errors, and confirm the calibration to the user by displaying a calibration status (block 190). If the mute button was not held in block 188, then the acceleration mode is toggled between forward (longitudinal) and lateral. If the user only meant to clear peak hold by momentary depression of the mute button, the mute button may be depressed momentarily again to return to the previous axis (not shown).

The accelerometer has a predetermined sample rate. Consequently, a determination is made with reference to an internal clock or by sensing the signal from the accelerometer as to whether it is time to read or measure the current acceleration (G) (block 194). If so, an acceleration counter is cleared that is used to trigger the next reading when reaching a threshold corresponding to the accelerometer output period. The accelerometer output period is recorded for use in calculating a pulse duty cycle that corresponds to acceleration. The X axis and Y axis pulse width signals are sensed and recorded by referencing the counter, which in the illustrative embodiment comprises a logic 1 wherein the pulse width is defined between a rising and falling edge (block 196).

With the readings stored for both the X axis (forward, longitudinal) and the Y axis (lateral), then a determination is made as to whether forward mode has been selected (block 198). If so, the forward G force is calculated by looking up the sensed pulse width in the acceleration lookup table. If not forward mode in block 198, then the lateral G force is calculated from the acceleration lookup table (block 202). Then the G force is displayed in the selected display format (e.g., NUM STD, NUM PEAK, BAR STD, BAR PEAK). After block 204, or if not time to measure the G back in block 194, routine 118 returns for additional sweeps and processing for alerts and acceleration readings.

In use, the detector 10 is set to a pilot mode for sound pressure level (SPL) and/or acceleration. The detector 10 sweeps with a front end portion 12 electromagnetic frequencies to receive signals characteristic of police traffic surveillance devices (e.g., RF band, laser). In response to the back end portion 14 detecting a received signal, the controller 28 initiates an alert on the display 18 and the speaker 48. When no alert is necessary, the controller 28 receives an SPL signal from music or road noise from SPL circuitry 54 and adjusts the gain setting to the SPL circuitry 54. An economical microphone 52, similar to those used in cordless telephones, senses the SPL and an operational amplifier 64 amplifies the SPL signal from the microphone 54 to a level suitable for input to an analog-to-digital converter, either discrete or integral to the microcontroller 28, prior to digital processing and display. To obtain a larger dynamic range of 75 dB, gain resistors are switched to maintain the signal in the proper operating range of the analog-to-digital converter. The approach leads to an economical SPL capability for less than $1.00 in variable cost to each detector 10.

The SPL signal is converted to a selected display format by the controller 28 and displayed on display 18. For example, four SPL modes may be provided in one exemplary embodiment of the invention. In such an embodiment, a numeric averaged meter mode displays SPL in a range covering 70 to 145 dB that is filtered for display similarly to C weighting. A numeric peak meter mode displays the peak SPL until cleared by depression of the mute button 40 or until the detector 10 is turned off. A low bar graph mode displays SPL in a range of 70 to 115 dB, which is the listening range for most users. For seven alphanumeric segments having a five-by-seven pixel, each pixel illuminated corresponds to a 1 dB increment. A high bar graph mode display SPL in a range of 70 to 145 dB, which advantageously alerts a user to SPL that may damage the ears. For the same alphanumeric segments, each pixel corresponds to a 2 dB increment.

Alternatively or in addition to SPL modes, the controller 28 may receive acceleration signals in longitudinal and lateral axes from an accelerometer 66 and display the value in the selected display format. Thus, car enthusiasts are able to see how fast their cars can go and how quickly they can accelerate. For example, traditional measures of automobile performance may be displaced by calculating a 0 to 60 m.p.h. time and a quarter mile time based on the longitudinal acceleration.

As an example, an exemplary implementation of the detector 10 may include six pilot modes for various acceleration-based calculations that may be displayed. In such an implementation, a numeric forward acceleration mode displays acceleration and deceleration in numeric form. The mode is capable of displaying increments of 1/100 of a G force. A plus (+) symbol indicates acceleration and a minus (−) sign indicates deceleration. A numeric lateral acceleration mode displays lateral acceleration in increments of 1/100 of a G force, with a plus (+) sign indicating a leftward acceleration and a minus (−) sign indicating a rightward acceleration. Switching between forward and lateral acceleration modes is accomplished by pressing the mute button 40 on the detector 10 when in either pilot mode. A bar graph forward acceleration mode has the 0 G point at the leftmost alphanumeric segment with an increase in acceleration increasing to the right. A plus (+) sign indicates acceleration and a minus(−) sign indicates deceleration. A bar graph lateral acceleration mode has the 0 G point centered, with leftward acceleration being represented by a leftward bar graph and with rightward acceleration being represented by a rightward bar graph. In 0-to-60 m.p.h. time mode, the time required for the vehicle to accelerate from a stop to 60 miles per hour is calculated and then displayed in numeric form. In quarter mile time mode, the detector 10 displays the time that it takes for the vehicle to traverse a quarter mile distance. The detector 10 is placed in this mode and the mute button 40 is depressed when the user is ready. As soon as the detector 10 senses acceleration, a clock timer is started. The detector 10 integrates the acceleration to calculate the velocity and integrates the velocity to calculate the distance. When the distance equals a quarter mile, the timer is stopped and the time displayed. A user calibration mode is used for the acceleration modes wherein the user positions 15 the vehicle on flat ground and depresses the mute button 40 for more than two seconds, calibrating the detector 10 for 0 G force.

By virtue of the foregoing, a detector 10 detects and provides additional sensing and display of at least one vehicle condition (e.g., SPL, acceleration) without impairing detection of RF and/or laser signals characteristic of police traffic surveillance devices. Thereby, the detector 10 is capable of providing valuable information to the user without the additional expense and inconvenience of integrating separate displays.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A detector, comprising:
   a display;
   a receiver operably configured to sense electromagnetic signals in at least one frequency band characteristic of police traffic surveillance devices;
   a sound pressure transducer configured to sense cockpit sound pressure level in the cockpit of a vehicle within which the detector is located; and
   a controller configured to initiate an alert in response to a sensed electromagnetic signal and to initiate depiction by the display of a sensed cockpit sound pressure level.

2. The detector of claim 1, wherein the controller is configured to detect and to display a peak, average, or real time value of cockpit sound pressure level.

3. The detector of claim 1, wherein the controller is configured to initiate depiction by the display of the cockpit sound pressure level as a bar graph.

4. The detector of claim 3, wherein the controller is configured to detect a peak, average, or real time value of the cockpit sound pressure level and to update the display of the bar graph to the peak, average, or real time value.

5. The detector of claim 1, further comprising a housing that encompasses the display, receiver and controller, wherein the sound pressure transducer is remotely positioned from the housing.

6. The detector of claim 1, further comprising a housing that encompasses the display, receiver, sound pressure transducer, and controller.

7. The detector of claim 1, wherein the controller is configured to initiate the alert by displaying the alert on the display.

8. The detector of claim 1, wherein the sensor comprises a microphone for sensing a sound pressure vehicle parameter.

9. The detector of claim 8, further comprising sound measuring circuitry including a gain amplifier for amplifying the sensed sound pressure, wherein the controller is further configured to sense a level of the sensed sound pressure and to command a selected gain by the gain amplifier in response thereto.

10. The detector of claim 9, wherein the sound measuring circuitry further comprises peak hold circuitry operative to sense a peak level of the sensed sound pressure, wherein the controller is further configured to selectably reset the peak hold circuitry.

11. The detector of claim 9 further comprising an audio speaker, wherein the controller is further configured to initiate the alert as an audible output by the audio speaker.

12. The detector of claim 1 further comprising an accelerometer for sensing an acceleration vehicle parameter.

13. The detector of claim 12, wherein the controller is configured to display the sensed acceleration vehicle parameter.

14. The detector of claim 12, wherein the controller is further configured to calculate a current velocity based on the sensed acceleration vehicle parameter.

15. The detector of claim 14, wherein the controller is further configured to track and display a time required for the current velocity to reach a velocity threshold.

16. The detector of claim 15, wherein the controller is further configured to track and display the time required for the current velocity to go from 0 to 60 miles per hour.

17. The detector of claim 14, wherein the controller is configured to calculate and to display a time required to travel a distance in response to the sensed acceleration vehicle parameter and to the calculated current velocity.

18. The detector of claim 17, wherein the controller is configured to calculate and to display a time required to travel a quarter mile in response to the sensed acceleration vehicle parameter and to the calculated current velocity.

19. The detector of claim 12, wherein the controller is further configured to respond to an axis selection operation to calculate and to display a selected one from a group consisting of lateral acceleration and longitudinal acceleration.

20. The detector of claim 19, wherein the axis selection operation comprises a user input selection.

21. The detector of claim 19, wherein the axis selection operation comprises installation of the detector on a lateral side, wherein the detector is further configured to respond to a constant one G force lateral acceleration by determining the axis selection operation to be longitudinal acceleration.

22. The detector of claim 21, wherein the detector is further configured to respond to a constant one G force lateral acceleration by rotating alphanumeric characters displayed for upright viewing.

23. The detector of claim 12, wherein the controller is further configured to calibrate a currently sensed acceleration vehicle parameter to 0 G force in response to a user input.

24. A method of detecting a police traffic surveillance device with a detector, comprising:

receiving electromagnetic signals in at least one frequency band characteristic of the police traffic surveillance device;

sensing a value of a vehicle cockpit sound pressure level;

generating an alert on the detector in response to detecting a received electromagnetic signal; and displaying on the detector the sensed value of the cockpit sound pressure level.

25. The method of claim 24, wherein sensing the vehicle parameter comprises sensing sound pressure with a microphone remote from the location of the detector.

26. The method of claim 25, further comprising:

amplifying an input signal of the sensed sound pressure; and changing the amplification of the input signal in response to the amplified input signal approaching an operating limit.

27. The method of claim 24 further comprising sensing acceleration.

28. The method of claim 27, further comprising calculating a selected one of a group consisting of lateral acceleration and longitudinal acceleration.

29. The method of claim 28, wherein calculating the selected one comprises calculating longitudinal acceleration, the method further comprising:

calculating an integral value of the longitudinal acceleration for velocity; and displaying a time required for the integral value to reach a selected threshold.

30. The method of claim 28, wherein calculating the selected one comprises calculating longitudinal acceleration, the method further comprising;

calculating an integral value of the longitudinal acceleration for velocity;

calculating the velocity integral value for distance; and displaying a time required for the distance integral value to reach a selected threshold.

31. An acceleration detector, comprising:

a display;

an acceleration sensor configured to sense an acceleration; and a controller configured to respond to detection of a constant acceleration by said sensor by determining an orientation of said detector.

32. The detector of claim 31 wherein said display displays alphanumeric characters and said controller is configured to set an orientation of said alphanumeric characters in response to said orientation of said detector.

33. The detector of claim 31 wherein said controller is configured to identify a direction of acceleration to display based upon the orientation of the detector.

* * * * *